United States Patent
Sallaberry (10) Patent No.: US 9,629,343 B1
(45) Date of Patent: Apr. 25, 2017

(54) SALMON MIGRATION LIFT DEVICE

(71) Applicant: Joe Sallaberry, Turlock, CA (US)

(72) Inventor: Joe Sallaberry, Turlock, CA (US)

( * ) Notice: Subject to any disclaimer, the term of this patent is extended or adjusted under 35 U.S.C. 154(b) by 0 days.

(21) Appl. No.: 15/252,969

(22) Filed: Aug. 31, 2016

(51) Int. Cl.
  *E02B 8/08* (2006.01)
  *A01K 61/00* (2017.01)
  *A01K 79/00* (2006.01)

(52) U.S. Cl.
  CPC ............ *A01K 61/00* (2013.01); *A01K 61/001* (2013.01); *A01K 79/00* (2013.01)

(58) Field of Classification Search
  CPC . E02B 8/08; E02B 8/085; E02B 1/006; A01K 63/02
  USPC ...................................................... 405/81–83
  See application file for complete search history.

(56) References Cited

U.S. PATENT DOCUMENTS

| | | | |
|---|---|---|---|
| 1,579,105 A | 3/1926 | Green | |
| 1,722,596 A | 7/1929 | Ross | |
| 2,625,798 A * | 1/1953 | Reed | E02B 7/205 405/106 |
| 2,803,949 A * | 8/1957 | Clark | E02B 8/085 405/83 |
| 2,922,282 A * | 1/1960 | Dohrer | E02B 8/085 119/219 |
| 3,038,760 A * | 6/1962 | Crooke | A01K 79/00 119/203 |
| 3,217,497 A * | 11/1965 | Humpherys | E02B 7/205 405/100 |
| 3,783,623 A | 1/1974 | Ogden | |
| 4,199,453 A | 4/1980 | McCawley et al. | |
| 4,576,237 A * | 3/1986 | Arney | A62C 8/02 169/53 |
| 4,713,929 A * | 12/1987 | Smith | A01D 44/00 56/8 |
| 4,904,114 A | 2/1990 | Warner et al. | |
| D509,885 S | 9/2005 | Cole | |
| 9,068,311 B2 | 6/2015 | Greif et al. | |
| 2007/0248415 A1* | 10/2007 | Kang | E02B 8/085 405/81 |
| 2011/0280662 A1* | 11/2011 | Millard | F15B 21/14 405/81 |

\* cited by examiner

*Primary Examiner* — Benjamin Fiorello
*Assistant Examiner* — Edwin Toledo-Duran
(74) *Attorney, Agent, or Firm* — Stevenson IP, LLC (57) ABSTRACT

A salmon migration lift device including a lift cable loop between two bullwheel terminals and a plurality of gondola buckets suspended from the lift cable loop which are filled with water and fish at a loading station on a downstream side of a waterway obstacle and which are emptied at an unloading station into a fish exit chute connected to the upstream side of the waterway obstacle.

3 Claims, 8 Drawing Sheets

SALMON MIGRATION LIFT DEVICE

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of devices and systems for facilitating the migration of fish due to the presence of dams and other waterway obstructions, such as quarries, levees, water vessel locks, hydroelectric plants, and sewage and water treatment plants, are known in the prior art. The obstructions restrict or alter the natural migratory routes of salmon and other fish which, in turn, disrupts reproduction and subjects the fish to predatory attacks, improper lighting, insufficient food sources, and incorrect water temperature. The present salmon migration lift device assists salmon and other fish in overcoming these problems by providing a lift cable loop between two bullwheel terminals and a plurality of gondola buckets suspended from the lift cable loop which are filled with water and fish at a loading station on a downstream side of a waterway obstacle and which are emptied at an unloading station into a fish exit chute in fluid communication with the upstream side of the waterway obstacle.

FIELD OF THE INVENTION

The present invention relates to devices and systems for facilitating the migration of fish due to the presence of obstructions in rivers and streams, and more particularly, to a salmon migration lift device which includes a lift cable loop between two bullwheel terminals and a plurality of gondola buckets suspended from the lift cable loop which are filled with water and fish at a loading station on a downstream side of a waterway obstacle and which are emptied at an unloading station into a fish exit chute connected to the upstream side of the waterway obstacle.

SUMMARY OF THE INVENTION

The general purpose of the present salmon migration lift device, described subsequently in greater detail, is to provide a salmon migration lift device which has many novel features that result in a salmon migration lift device which is not anticipated, rendered obvious, suggested, or even implied by prior art, either alone or in combination thereof. To accomplish this, the present salmon migration lift device facilitates the migration of salmon as well as other fish upstream past a waterway obstacle, such as a dam or a hydroelectric plan by providing a motorized drive-gear based, gear-reduction set and clutch arrangement bucket lift system. The lift system includes a first bullwheel terminal, which has a horizontal pinion pulley, disposed proximal a lock on a downstream side of a waterway obstacle. The lift system further includes a loading station disposed directly adjacent and in fluid communication with a portion of the downstream side of the waterway obstacle. The loading station includes a reinforced concrete entrance chute disposed proximal the first bullwheel terminal and which directs water therethrough from the downstream side into the loading station. The entrance chute includes an automatic solar powered valve controlled first gate disposed therein proximal the entry end and an automatic solar powered valve controlled second gate spaced apart from the first gate. The lock is disposed between the first and second gates and has electronic fish counter disposed therein. An upper end of a circulation pipeline is disposed between the fish counter and the second gate.

A reinforced concrete loading station chute is in direct fluid communication with the entrance chute and directly adjacent to the second gate and is located at a lower grade than a grade of the entrance chute. The loading station chute has an upper side directly adjacent the second gate and a bottom end. The loading station chute further includes an initial end of a return pipeline disposed in the bottom end of the loading station chute. An inclined grate has a top end disposed at the upper side directly adjacent the second gate, a lower end, and a central portion between the top end and the lower end. An exit end of the loading station chute is disposed opposite the second gate. A shelf wall is disposed on the exit end in a position above the return pipeline and below the grade of the second gate. The portion of the downstream side of the waterway in fluid communication with the loading station flows through the central portion of the inclined gate into the bottom end and into the initial end of the return pipeline.

A second bullwheel terminal is disposed on an upstream side of the waterway obstacle and includes a horizontal idler pulley. A continuously moving lift cable loop is in operational communication with the first and second bullwheel terminals and is rotationally disposed therebetween. The lift cable loop has a lower segment and an upper segment. A sliding mount body of the horizontal pinion pulley is mounted to a counterweight on the lift cable loop in order to maintain tension on the lift cable loop. At least two spaced apart cable support members are provided. Each cable support member is directly connected to both the lower segment and the upper segment in a position perpendicular thereto and between a respective one of the first bullwheel terminal and the second bullwheel terminal.

A plurality of spaced apart gondola buckets, configured to carry water and fish therein, is continuously suspended along the lift cable loop. A portion of the gondola buckets on the lower segment is conveyed by the lift cable loop from the first bullwheel terminal to the second bullwheel terminal and a portion of the gondola buckets on the upper segment is conveyed from the second bullwheel terminal to the first bullwheel terminal. Each gondola bucket has a storage container defined by front, rear, right, left, bottom and top sides thereof. A frame atop each gondola bucket has a leg disposed on each of a corner of the top side and a crossmember connecting a topmost end of each leg. The crossmember is attached to a proximal end of a grip. A distal end of the grip is attached onto the lift cable loop. An upwardly slidable door is disposed in the front side proximal the bottom side. Each gondola bucket is independently disposed atop the shelf wall at a pre-set time interval when the respective gondola bucket is moved atop the shelf wall by the lift cable loop. The storage container of each gondola bucket is configured to hold a volume of water at a depth of 20 inches. Each gondola bucket has a length of approximately 3 feet, a width of approximately 2 feet, and a height of approximately thirty inches. Each gondola bucket is configured to store six average-sized adult salmon.

A solar powered valve is disposed on the gondola bucket and is in operational communication with the door. The valve opens the door and alternately closes the door when the gondola bucket is disposed atop the shelf wall. A level sensor is disposed on the front side proximal the top side and is in operational communication with the valve disposed on the gondola bucket. The lower end of the inclined grate is disposed directly above and directly adjacent the storage container of the respective gondola bucket when the respective gondola bucket is disposed atop the shelf wall. Upon a predetermined count of fish within the lock and upon disposition of one of the plurality of gondola buckets atop the shelf wall, the second gate moves from a closed condition to an open condition. Upon the moving of the second gate to the open position, all fish within the lock are released through the second gate, across the inclined grate, and into the storage container of the respective gondola bucket having the door in a closed condition. Immediately subsequent to the opening of the second gate and the disposition of the respective gondola bucket atop the shelf wall, the respective gondola bucket is moved toward the second bullwheel terminal.

An unloading station is disposed proximal the second bullwheel terminal between the second bullwheel terminal and the loading station. The unloading station includes a reinforced concrete fish exit chute having first end and a second end. Upon alignment of the door of the respective gondola bucket with the fish exit chute first end, the door is configured to automatically open to release the fish contained within the respective gondola bucket from the gondola bucket into the fish exit chute and therefrom into the upstream side of the waterway. The solar powered valve disposed on the gondola bucket is configured to open the door at a pre-set time interval at the unloading station regardless of the number of fish disposed within the lock as determined by the fish counter. The circulation pipeline has an uppermost end disposed directly adjacent the first end of the fish exit chute and a lowermost end in direct fluid communication with the loading station chute. A sand trap is disposed proximal the circulation pipeline. A sand trap flush pipeline extends from the sand trap to the downstream side of the waterway.

A gondola bucket water refill station is disposed directly adjacent the upper segment of the lift cable loop proximal the second bullwheel terminal. A refill pipeline extends from the circulation pipeline to the gondola bucket refill station. Water released from the gondola bucket into the fish exit chute and the circulation pipeline flows into the refill pipeline and therefrom through a refill valve and into the gondola bucket refill station. Water from the gondola bucket refill station is configured to flow into the respective gondola bucket. Upon the detection of a full level of the gondola bucket by the level sensor on the gondola bucket, the level sensor activates the refill valve to close the refill pipeline into the respective gondola bucket. The refill pipeline maintains an open condition until the level sensor detects a full level when the respective gondola bucket is in fluid communication with the refill pipeline at the gondola bucket water refill station.

A gondola drain station is disposed proximal the lift cable loop proximal the first bullwheel terminal. A return pipeline extends from the gondola drain station into the downstream side of the waterway. Each gondola bucket is drained by one-third of the water contained in the gondola bucket at the gondola drain station into the return pipeline. A plurality of support towers, having a topmost side coplanar with an uppermost end of the waterway obstacle in a position above the waterway, is configured to support the bucket lift system in a proper operational condition.

The present salmon migration lift device is believed to provide a less expensive mode of transport to move the fish from the downstream side to the upstream side of the waterway than transporting the fish by a vehicle, such as a truck. Thus has been broadly outlined the more important features of the present salmon migration lift device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

With reference now to the drawings, and in particular FIGS. 1 through 7B thereof, an example of the instant salmon migration lift device employing the principles and concepts of the present salmon migration lift device and generally designated by the reference number 10 will be described.

Referring to FIGS. 1 through 7B the present salmon migration lift device 10 is illustrated. The salmon migration lift device 10 facilitates migration of fish past dams and other obstacles in waterways. The salmon migration lift device 10 includes a motorized drive-gear based, gear-reduction set and clutch arrangement bucket lift system 20. The lift system 20 includes a first bullwheel terminal 22 proximal a lock 24 on a downstream side, designated as 'A' in the figures, of a waterway obstacle, indicated by 'B' in the figures. The first bullwheel terminal 22 includes a horizontal pinion pulley. The lift system 20 further includes a loading station 30 disposed directly adjacent and in fluid communication with a portion of the downstream side of the waterway obstacle. The loading station 30 includes a reinforced concrete entrance chute 32 disposed proximal the first bullwheel terminal 22 and in fluid communication with the portion of the downstream side of the waterway which is in fluid communication with the loading station 30. The entrance chute 32 is configured to convey the portion of water from the downstream side of the waterway therethrough.

Figure 3:
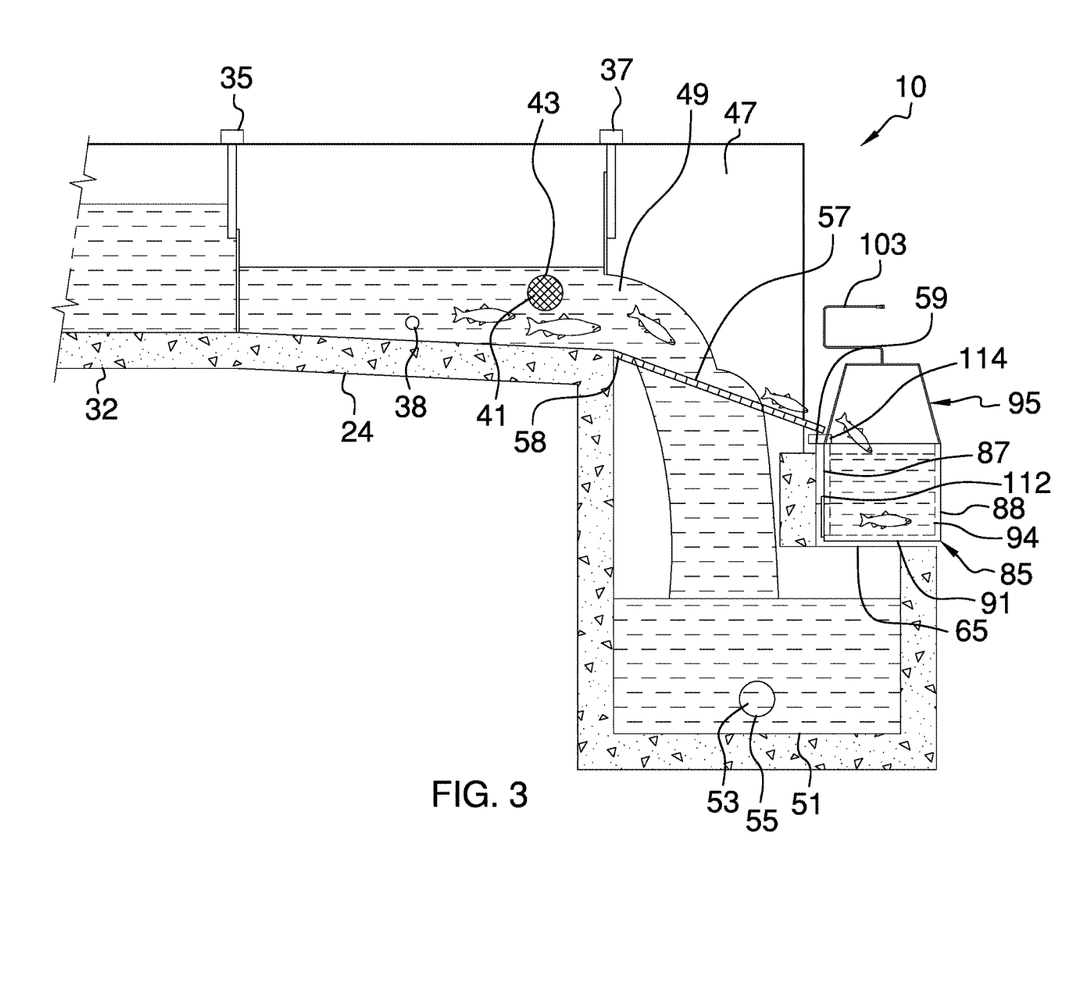
FIG. 3 is a side elevation view of a loading station.
Figure 7A:
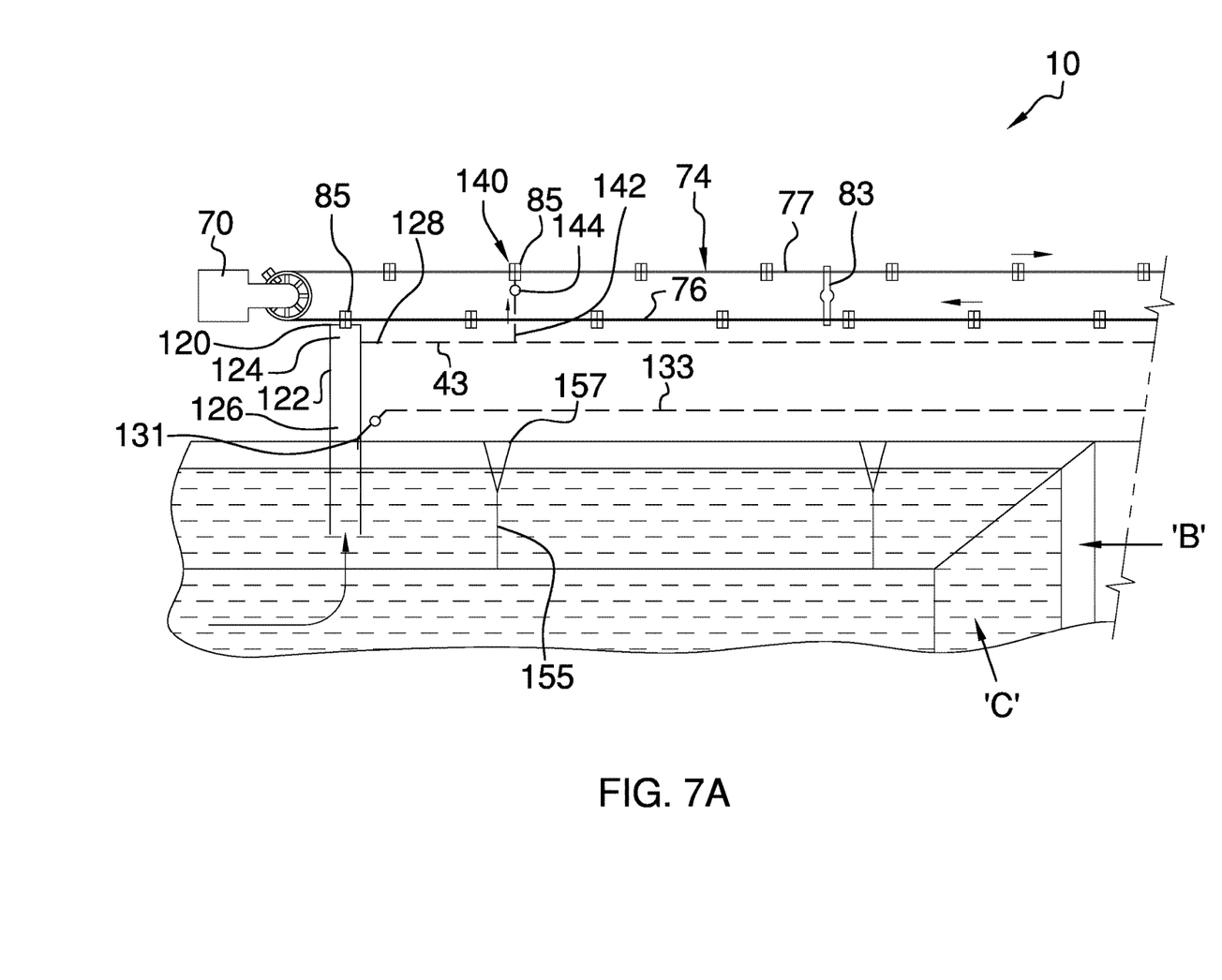
FIG. 7A is a top plan diagram of operational components and water flow at an upper level of the lift system on an upstream side of a dam.
Figure 7B:
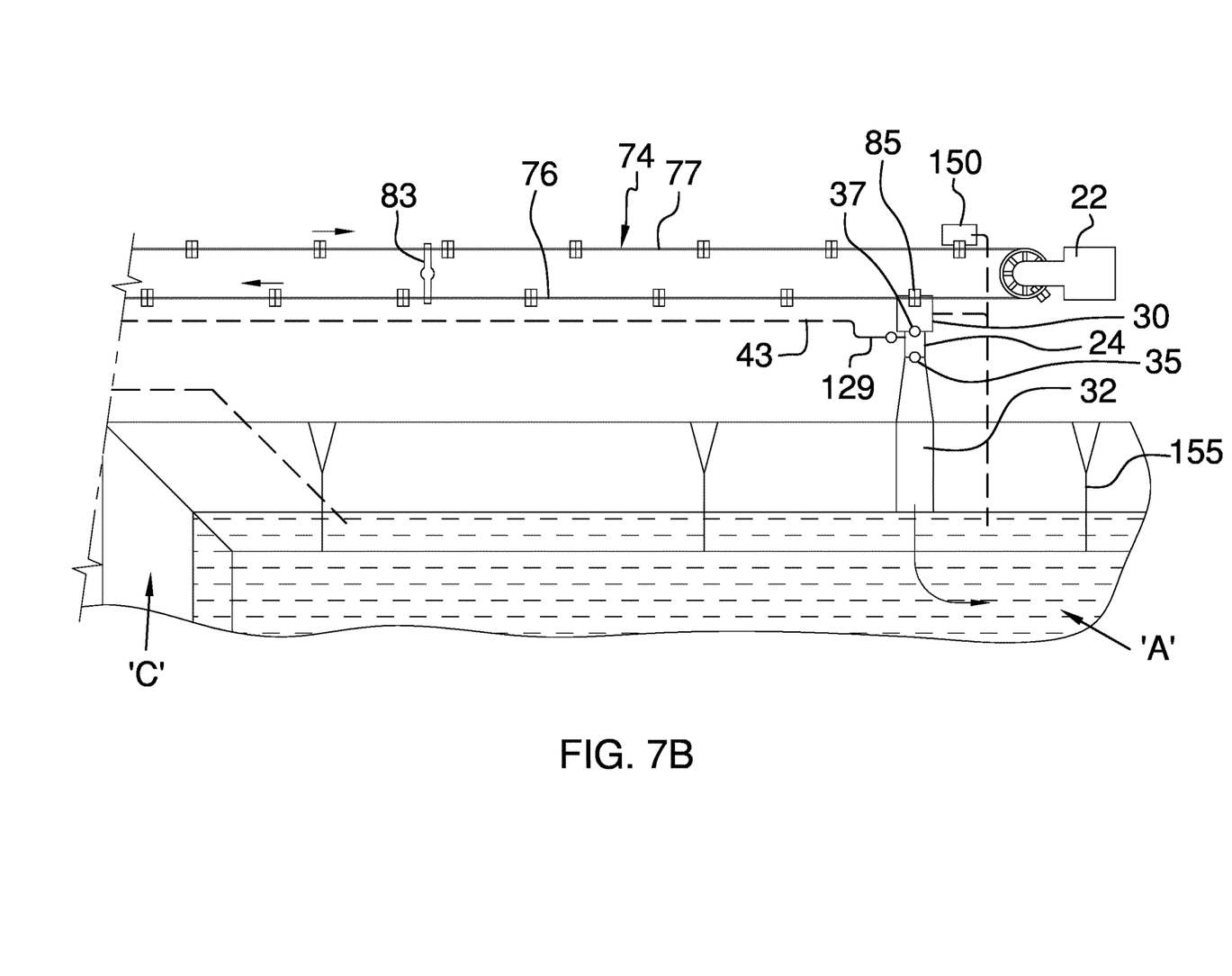
FIG. 7B is a top plan diagram in continuation of FIG. 7A showing operational components and water flow at a lower level of the lift system on a downstream side of the dam.

The entrance chute 32 has an entry end 33 directly in the waterway and includes an automatic solar powered valve controlled first gate 35 disposed therein proximal the entry end 33. An automatic solar powered valve controlled second gate 37 is disposed within the entrance chute 32 and spaced apart from the first gate 35. The lock 24 is disposed between the first gate 35 and the second gate 37. An electronic fish counter 38 disposed within the lock 24. An upper end 41 of a circulation pipeline 43 is disposed between the fish counter 38 and the second gate 37.

A reinforced concrete loading station chute 47 is in direct fluid communication with the entrance chute 32 and directly adjacent to the second gate 37. The loading station chute 47 is disposed at a lower grade than a grade of the entrance chute 32. The loading station chute 47 has an upper side 49 directly adjacent the second gate 37 and a bottom end 51. The loading station chute 47 includes an initial end 53 of a return pipeline 55 disposed in the bottom end 51 of the loading station chute 47. An inclined grate 57 has a top end 58 disposed at the upper side 49 directly adjacent the second gate 37, a lower end 59, and a central portion 61 between the top end 58 and the lower end 59. An exit end 63 of the loading station chute 47 is disposed opposite the second gate 37. A shelf wall 65 is disposed on the exit end 63 in a position above the return pipeline 55 and below the grade of the second gate 37. The portion of the downstream side of the waterway in fluid communication with the loading station 30 flows through the central portion 61 of the inclined grate 57 into the bottom end 51 and into the initial end 53 of the return pipeline 55.

Figure 6:
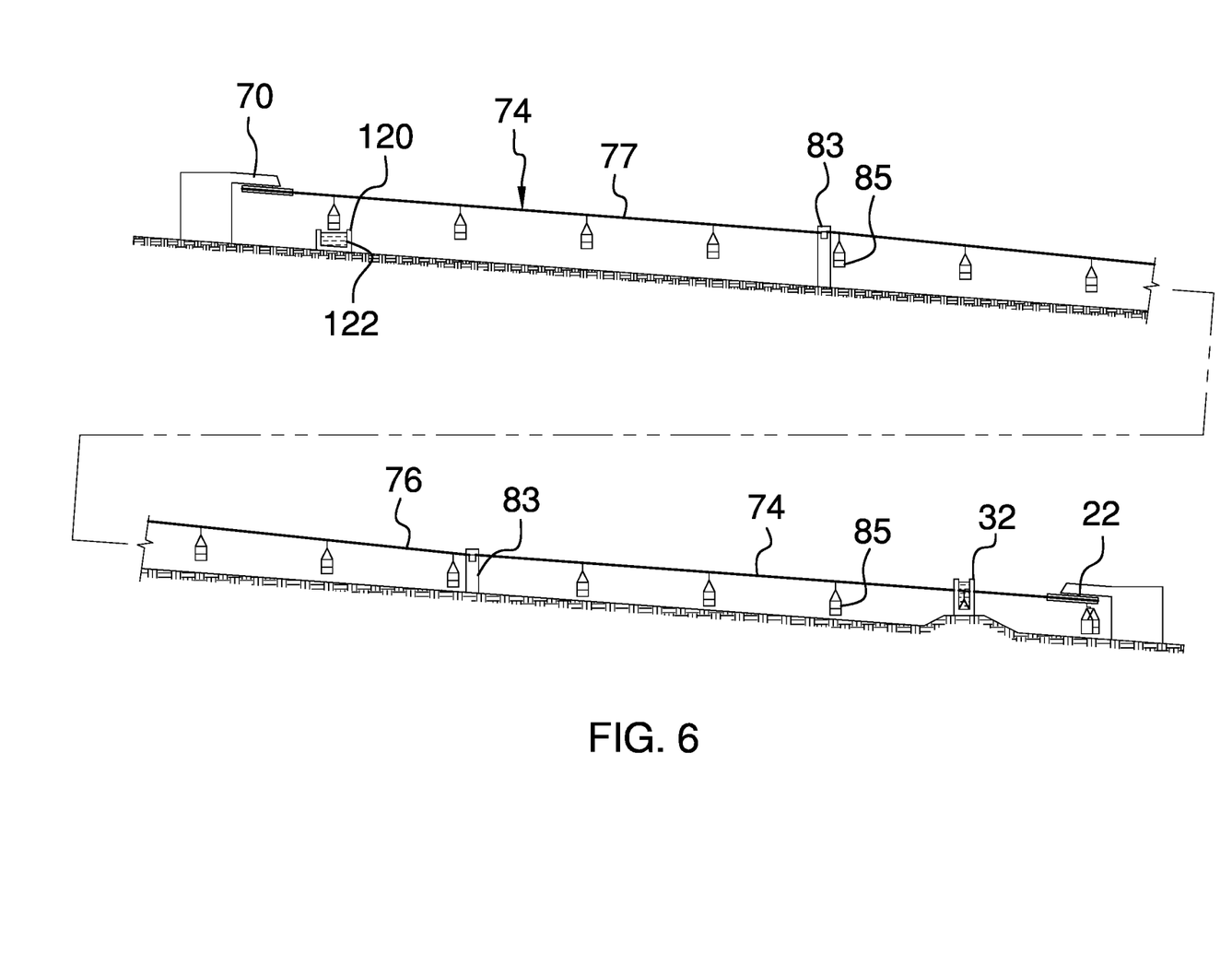
FIG. 6 is a side elevation of a lift system.

A second bullwheel terminal 70 is disposed on an upstream side, designated by 'C' in the figures, of the waterway obstacle and includes a horizontal idler pulley. A continuously moving lift cable loop 74 is in operational communication with the first and second bullwheel terminals 22, 70 and is rotationally disposed therebetween. The lift cable loop 74 has a lower segment 76 and an upper segment 77. A sliding mount body 79 of the horizontal pinion pulley 26 is mounted to a counterweight 81 on the lift cable loop 74 in order to maintain tension on the lift cable loop 74. At least two spaced apart cable support members 83 are provided. Each cable support member 83 is directly connected to both the lower segment 76 and the upper segment 77 in a position perpendicular thereto and between a respective one of the first bullwheel terminal 22 and the second bullwheel terminal 70.

Figure 1:
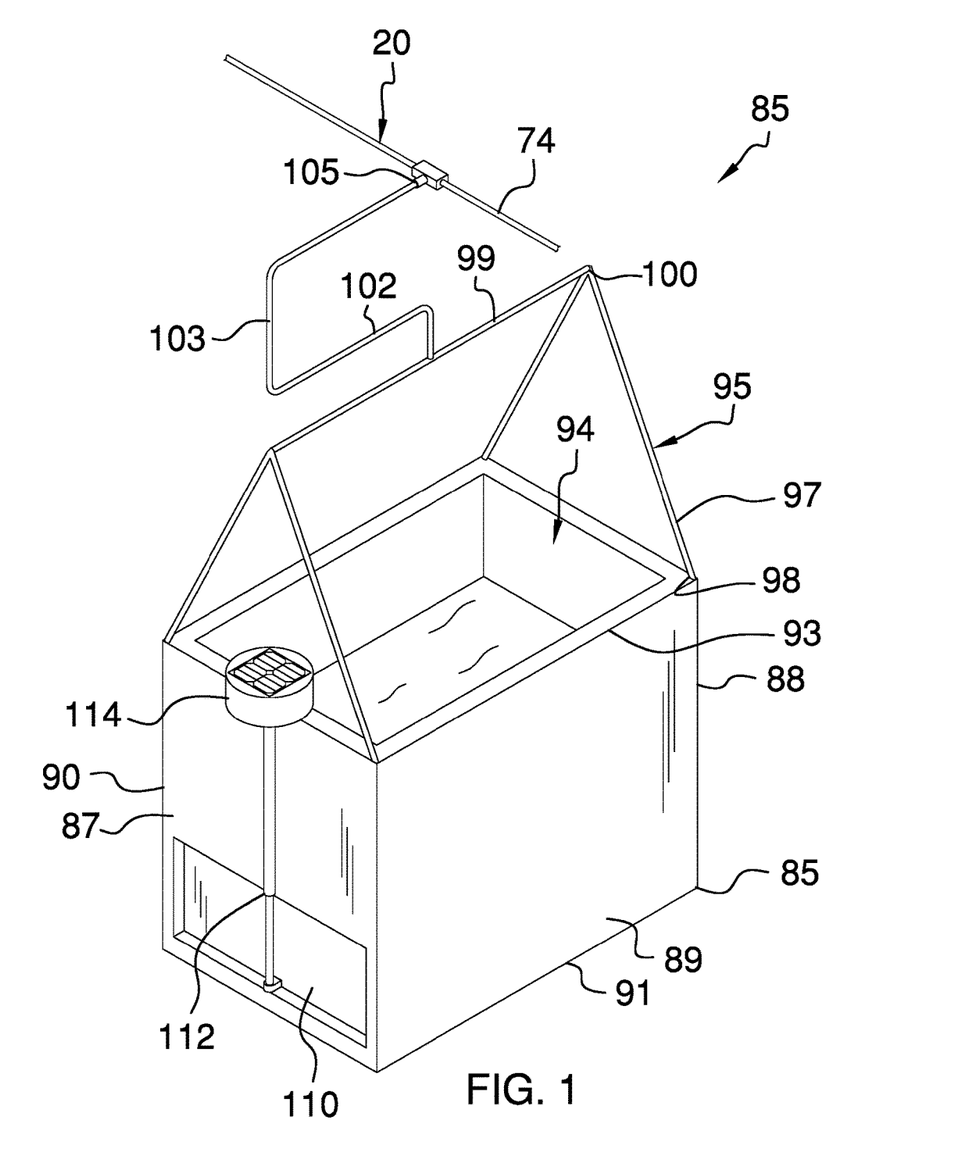
FIG. 1 is an isometric view of a gondola bucket attached to a portion of a lift cable loop, a valve-controlled door, and a solar powered level sensor disposed on a front side of the gondola bucket.
Figure 2:
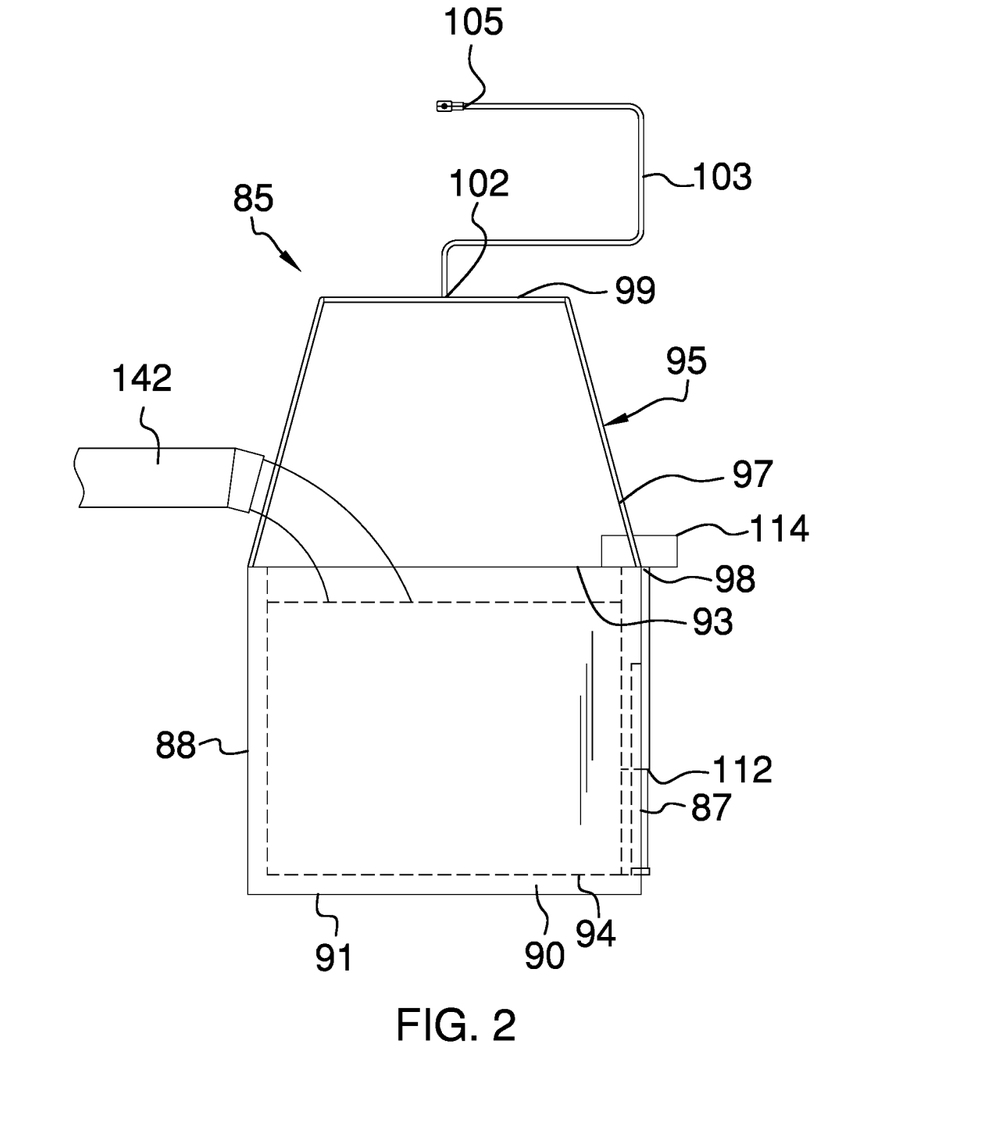
FIG. 2 is a left side elevation view of the gondola bucket.

A plurality of spaced apart gondola buckets 85, configured to carry water and fish therein, is continuously suspended along the lift cable loop 74. A portion of the gondola buckets 85 on the lower segment 76 is conveyed by the lift cable loop 74 from the first bullwheel terminal 22 to the second bullwheel terminal 70 and a portion of the gondola buckets 85 on the upper segment 77 is conveyed from the second bullwheel terminal 70 to the first bullwheel terminal 22. Each gondola bucket 85 has a front side 87, a rear side 88, a right side 89, a left side 90, a closed rectangular bottom side 91, an open top side 93, and a storage container 94 defined by the front, rear, right, left, bottom and top sides 87, 88, 89, 90, 91, 93. A frame 95 atop each gondola bucket 85 has a leg 97 disposed on each of a corner 98 of the top side 93 and a crossmember 99 connecting a topmost end 100 of each leg 97. The crossmember 99 is attached to a proximal end 102 of a grip 103. A distal end 105 of the grip 103 is attached onto the lift cable loop 74. An upwardly slidable door 110 is disposed in the front side 87 proximal the bottom side 91. Each gondola bucket 85 is independently disposed atop the shelf wall 65 at a pre-set time interval when the respective gondola bucket 85 is moved atop the shelf wall 65 by the lift cable loop 74. The storage container 94 of each gondola bucket 85 is configured to hold a volume of water at a depth of 20 inches. Each gondola bucket 85 has a length of approximately 3 feet, a width of approximately 2 feet, and a height of approximately thirty inches.

A solar powered valve 112 is disposed on the gondola bucket 85 and is in operational communication with the door 110. The valve 112 opens the door 110 and alternately closes the door 110 when the gondola bucket 85 is disposed atop the shelf wall 65. A level sensor 114 is disposed on the front side 87 proximal the top side and is in operational communication with the valve 112 disposed on the gondola bucket 85. The lower end 59 of the inclined grate 57 is disposed directly above and directly adjacent the storage container 94 of the respective gondola bucket 85 when the respective gondola bucket 85 is disposed atop the shelf wall 65. Upon a predetermined count of fish within the lock 24 and upon disposition of one of the plurality of gondola buckets 85 atop the shelf wall 65, the second gate 37 moves from a closed condition to an open condition. Upon the moving of the second gate 37 to the open position, all fish within the lock 24 are released through the second gate 37, across the inclined grate 57, and into the storage container 94 of the respective gondola bucket 85 having the door 110 in a closed condition. Immediately subsequent to the opening of the second gate 37 and the disposition of the respective gondola bucket 85 atop the shelf wall 65, the respective gondola bucket 85 is moved toward the second bullwheel terminal 70.

Figure 4:
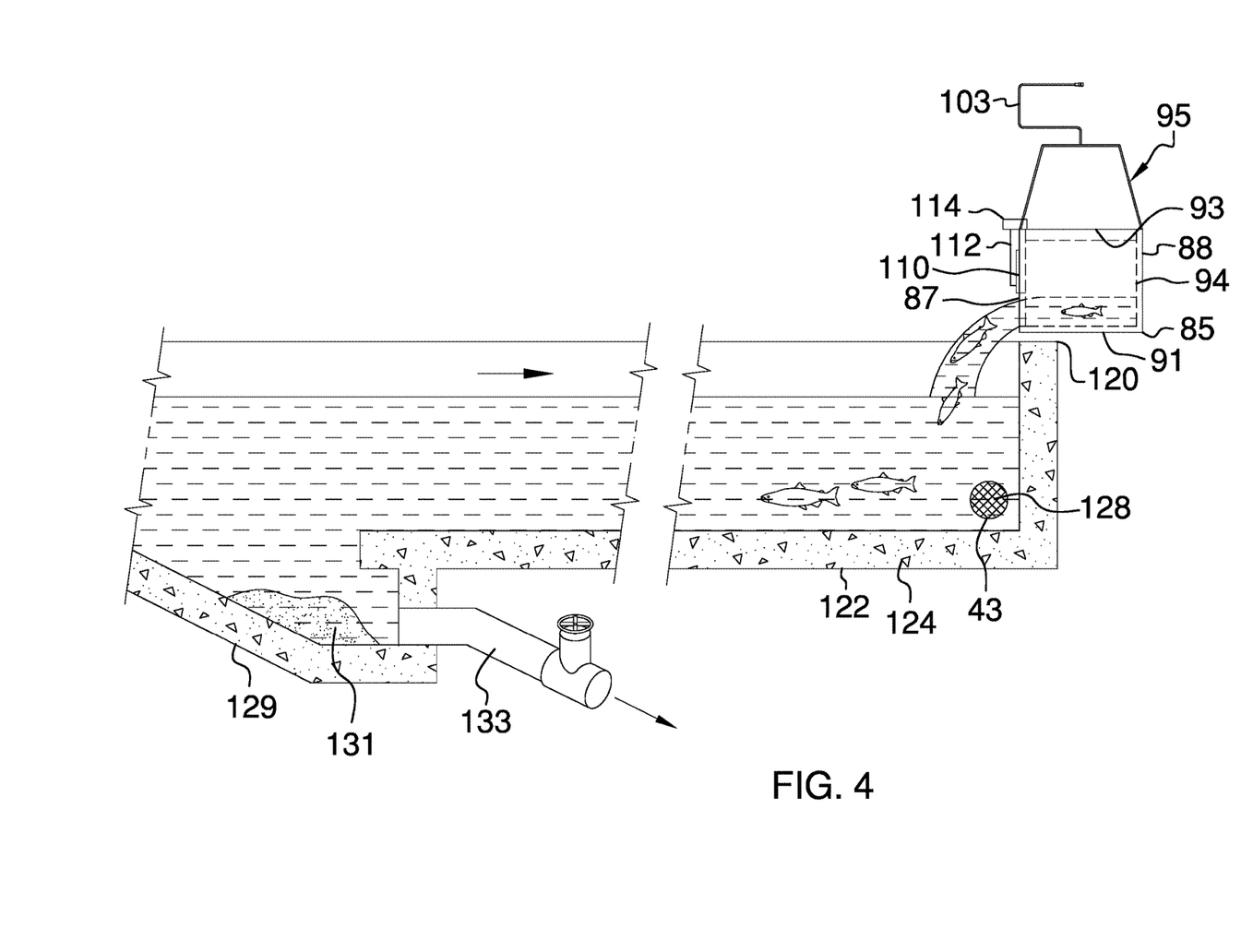
FIG. 4 is a side elevation view of an unloading station.

An unloading station 120 is disposed proximal the second bullwheel terminal 70 between the second bullwheel terminal 70 and the loading station 30. The unloading station 120 includes a reinforced concrete fish exit chute 122 having first end 124 and a second end 126. Upon alignment of the door 110 of the respective gondola bucket 85 with the fish exit chute 122 first end 124, the door 110 is configured to automatically open to release the fish contained within the respective gondola bucket 85 from the gondola bucket 85 into the fish exit chute 122 and therefrom into the upstream side of the waterway. The solar powered valve 112 disposed on the gondola bucket 85 is configured to open the door 110 at a pre-set time interval at the unloading station 120 regardless of the number of fish disposed within the lock 24 as determined by the fish counter 38. The circulation pipeline 43 has an uppermost end 128 disposed directly adjacent the first end 124 of the fish exit chute 122 and a lowermost end 129 in direct fluid communication with the loading station chute 47. A sand trap 131 is disposed proximal the circulation pipeline 43. A sand trap flush pipeline 133 extends from the sand trap 131 to the downstream side of the waterway.

A gondola bucket water refill station 140 is disposed directly adjacent the upper segment 77 of the lift cable loop 74 proximal the second bullwheel terminal 70. A refill pipeline 142 extends from the circulation pipeline 43 to the gondola bucket refill station 140. Water released from the gondola bucket 85 into the fish exit chute 122 and the circulation pipeline 43 flows into the refill pipeline 142 and therefrom through a refill valve 144 and into the gondola bucket refill station 140. Water from the gondola bucket refill station 140 is configured to flow into the respective gondola bucket 85. Upon the detection of a full level of the gondola bucket 85 by the level sensor 114 on the gondola bucket 85, the level sensor 114 activates the refill valve 144 to close the refill pipeline 142 into the respective gondola bucket 85. The refill pipeline 142 maintains an open condition until the level sensor 114 detects a full level when the respective gondola bucket 85 is in fluid communication with the refill pipeline 142 at the gondola bucket water refill station 140.

Figure 5:
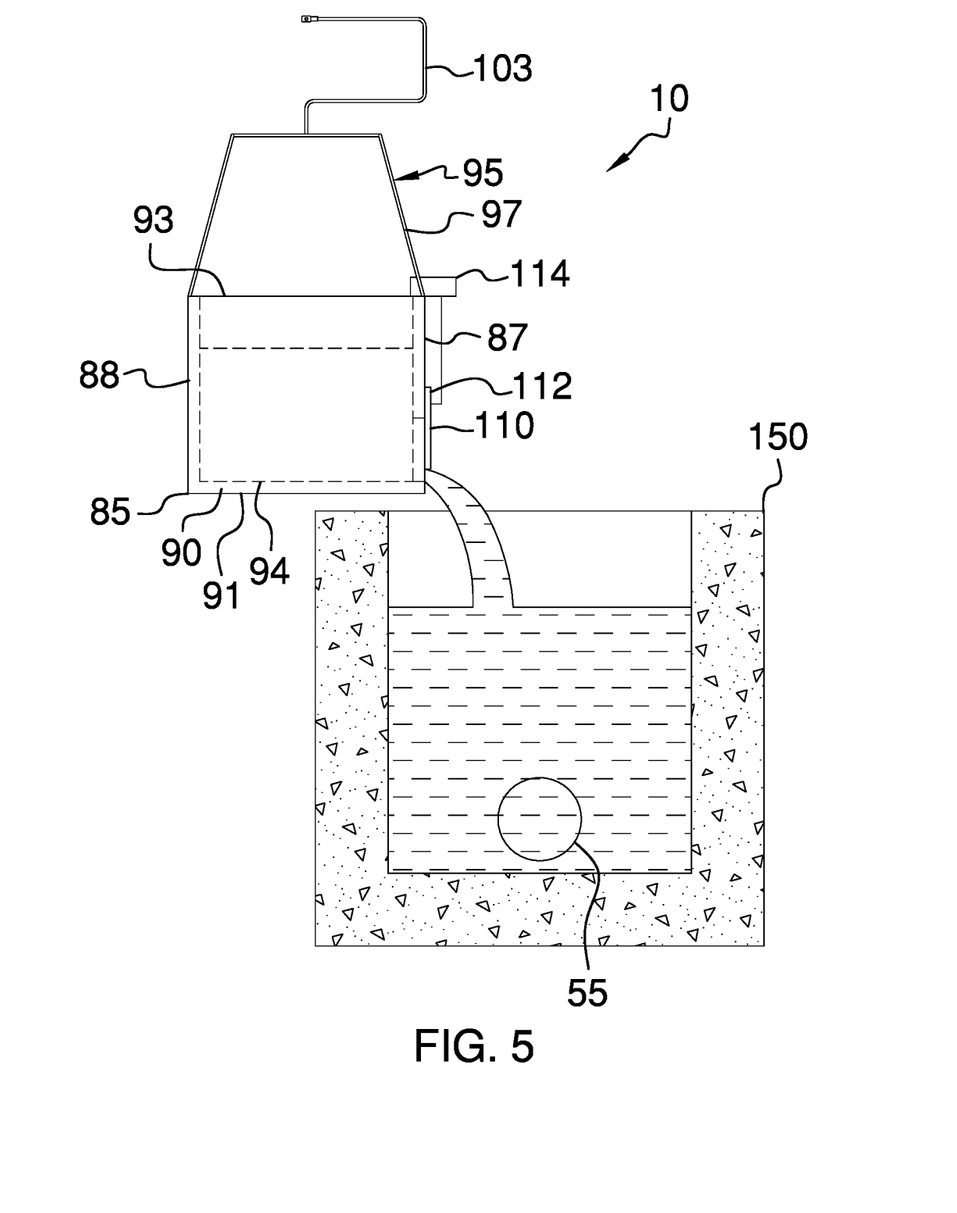
FIG. 5 is a side elevation of a gondola bucket drain station.

A gondola drain station 150 is disposed proximal the lift cable loop 74 proximal the first bullwheel terminal 22. A return pipeline 55 extends from the gondola drain station 150 into the downstream side of the waterway. Each gondola bucket 85 is drained by one-third of the water contained in the gondola bucket 85 at the gondola drain station 150 into the return pipeline 55.

A plurality of support towers 155, having a topmost side 157 coplanar with an uppermost end of the waterway obstacle in a position above the waterway, is configured to support the bucket lift system 20 in a proper operational condition.

What is claimed is:

1. A salmon migration lift device for facilitating migration of fish past dams and other obstacles in waterways, the salmon migration lift device comprising:
    a motorized drive-gear based, gear-reduction set and clutch arrangement bucket lift system including:
        a first bullwheel terminal proximal a lock on a downstream side of a waterway obstacle;
        a loading station disposed directly adjacent and in fluid communication with a portion of the downstream side of the waterway, the loading station comprising:
            a reinforced concrete entrance chute disposed proximal the first bullwheel terminal and in fluid communication with the portion of the downstream side of the waterway in fluid communication with the loading station, the entrance chute configured to convey the portion of water from the downstream side of the waterway therethrough, the entrance chute having an entry end directly in the waterway, the entrance chute comprising:
                an automatic solar powered valve controlled first gate disposed within the entrance chute proximal the entry end;
                an automatic solar powered valve controlled second gate disposed within the entrance chute and spaced apart from the first gate;
                wherein the lock is disposed between the first gate and the second gate;
                an electronic fish counter disposed within the lock;
                an upper end of a circulation pipeline disposed between the fish counter and the second gate;
            a reinforced concrete loading station chute in direct fluid communication with the entrance chute and directly adjacent to the second gate, the loading station chute disposed at a lower grade than a grade of the entrance chute, the loading station chute having an upper side directly adjacent the second gate and a bottom end, the loading station chute comprising:
                an initial end of a return pipeline disposed in the bottom end of the loading station chute;
                an inclined grate disposed having a top end disposed at the upper side directly adjacent the second gate, a lower end, and a central portion between the top end and the lower end;
                an exit end of the loading station chute opposite the second gate;
                a shelf wall disposed on the exit end in a position above the return pipeline and below the grade of the second gate;
                wherein the portion of the downstream side of the waterway in fluid communication with the loading station flows through the central portion of the inclined gate into the bottom end and into the initial end of the return pipeline;
        a second bullwheel terminal on an upstream side of the waterway obstacle, the second bullwheel terminal including a horizontal pinion pulley;
        a continuously moving lift cable loop in operational communication with the first and second bullwheel terminals, the lift cable loop rotationally disposed between the first and second bullwheel terminals, the lift cable loop having a lower segment and an upper segment;
        a sliding mount body of the horizontal pinion pulley, wherein the sliding mount body is mounted to a counterweight on the lift cable loop, wherein the mounting of the horizontal pinion pulley to the lift cable loop is configured to maintain tension on the lift cable loop;
        at least two spaced apart cable support members, each cable support member directly connected to both the lower segment and the upper segment in a position perpendicular thereto and between a respective one of the first bullwheel terminal and the second bullwheel terminal;
        a plurality of spaced apart gondola buckets continuously suspended along the lift cable loop, a portion of the gondola buckets on the lower segment being conveyed by the lift cable loop from the first bullwheel terminal to the second bullwheel terminal and a portion of the gondola buckets on the upper segment being conveyed from the second bullwheel terminal to the first bullwheel terminal, wherein the gondola buckets are configured to carry fish therein, wherein each gondola bucket comprises:
            a front side, a rear side, a right side, a left side, a closed bottom side, an open top side, and a storage container defined by the front, rear, right, left, bottom and top sides;
            a frame having a leg disposed on each of a corner of the top side and a crossmember connecting a top end of each leg, the crossmember attached to a proximal end of a grip, wherein a distal end of the grip is attached onto the lift cable loop;
            an upwardly slidable door disposed in the front side proximal the bottom side;
            each gondola bucket being independently disposed atop the shelf wall at a pre-set time interval when the respective gondola bucket is moved atop the shelf wall by the lift cable loop;
            a solar powered valve disposed on the gondola bucket in operational communication with the door, wherein the valve opens the door and alternately closes the door when the gondola bucket is disposed atop the shelf wall;
            a level sensor disposed on the front side proximal the top side, wherein the level sensor is in operational communication with the valve disposed on the gondola bucket;
            wherein the lower end of the inclined grate is disposed directly above and directly adjacent the storage container of the respective gondola bucket when the respective gondola bucket is disposed atop the shelf wall;
            wherein upon a predetermined count of fish within the lock and upon disposition of one of the plurality of gondola buckets atop the shelf wall, the second gate moves from a closed condition to an open condition, wherein upon the moving of the second gate to the open position, all fish within the lock are released through the second gate, across the inclined grate, and into the storage container of the respective gondola bucket having the door in a closed condition;

wherein immediately subsequent to the opening of the second gate and the disposition of the respective gondola bucket atop the shelf wall, the respective gondola bucket is moved toward the second bullwheel terminal;

an unloading station disposed proximal the second bullwheel terminal between the second bullwheel terminal and the loading station, the unloading station comprising:

a reinforced concrete fish exit chute having first end and a second end;

wherein upon alignment of the door of the respective gondola bucket with the fish exit chute first end, the door is configured to automatically open, wherein the fish contained within the respective gondola bucket are released from the gondola bucket upon the automatic opening of the door into the fish exit chute and therefrom into the upstream side of the waterway;

an uppermost end of the circulation pipeline disposed directly adjacent the first end of the fish exit chute and a lowermost end of the circulation pipeline in direct fluid communication with the loading station chute;

a sand trap disposed proximal the circulation pipeline;

a sand trap flush pipeline extending from the sand trap to the downstream side of the waterway;

wherein the solar powered valve disposed on the gondola bucket is configured to open the door at a pre-set time interval at the unloading station regardless of the number of fish disposed within the lock as determined by the fish counter;

a gondola bucket water refill station disposed directly adjacent the upper segment of the lift cable loop proximal the second bullwheel terminal;

a refill pipeline extending from the circulation pipeline to the gondola bucket refill station, wherein water released from the gondola bucket into the fish exit chute and the circulation pipeline flows into the refill pipeline and therefrom through a refill valve and into the gondola bucket refill station, wherein water from the gondola bucket refill station is configured to flow into the respective gondola bucket;

wherein upon the detection of a full level of the gondola bucket by the level sensor on the gondola bucket, the level sensor activates the refill valve to close the refill pipeline into the respective gondola bucket, wherein the refill pipeline maintains an open condition until the level sensor detects a full level when the respective gondola bucket is in fluid communication with the refill pipeline at the gondola bucket water refill station;

a gondola drain station disposed proximal the lift cable loop proximal the first bullwheel terminal;

a return pipeline extending from the gondola drain station into the downstream side of the waterway; and a plurality of support towers having a top end coplanar with an uppermost end of the waterway obstacle in a position above the waterway, the support towers being configured to support the bucket lift system in a proper operational condition.

2. The salmon migration lift device of claim 1 wherein each gondola bucket is drained by one-third of the water in the gondola bucket contains at the gondola drain station into the return pipeline.

3. The salmon migration lift device of claim 1 wherein the storage container of each gondola bucket is configured to hold a volume of water at a depth of 20 inches; and wherein each gondola bucket has a length of approximately 3 feet, a width of approximately 2 feet, and a height of approximately thirty inches.

* * * * *